United States Patent
Guettaf

(10) Patent No.: US 7,058,868 B2
(45) Date of Patent: Jun. 6, 2006

(54) SCAN TESTING MODE CONTROL OF GATED CLOCK SIGNALS FOR MEMORY DEVICES

(75) Inventor: Amar Guettaf, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 411 days.

(21) Appl. No.: 10/640,659

(22) Filed: Aug. 14, 2003

(65) Prior Publication Data

US 2005/0039095 A1    Feb. 17, 2005

(51) Int. Cl.
*G01R 31/28*    (2006.01)

(52) U.S. Cl. .................. 714/727; 714/718; 714/729

(58) Field of Classification Search ............... 714/726, 714/30, 727, 731, 718, 729; 703/23; 326/38
See application file for complete search history.

(56) References Cited

U.S. PATENT DOCUMENTS

| | | | | |
|---|---|---|---|---|
| 4,493,077 A * | 1/1985 | Agrawal et al. | ............ | 714/731 |
| 5,235,600 A * | 8/1993 | Edwards | ............ | 714/731 |
| 5,621,651 A * | 4/1997 | Swoboda | ............ | 703/23 |
| 5,812,562 A * | 9/1998 | Baeg | ............ | 714/726 |
| 6,452,435 B1 * | 9/2002 | Skergan et al. | ............ | 327/293 |
| 6,539,497 B1 * | 3/2003 | Swoboda et al. | ............ | 714/30 |
| 6,760,866 B1 * | 7/2004 | Swoboda et al. | ............ | 714/34 |
| 6,861,867 B1 * | 3/2005 | West et al. | ............ | 326/38 |

* cited by examiner

*Primary Examiner*—David Ton
(74) *Attorney, Agent, or Firm*—Sterne, Kessler, Goldstein & Fox, P.L.L.C.

(57) ABSTRACT

Circuits and methods to enhance scan testing by controlling clock pulses that are provided to memory devices within an integrated circuit are provided. An integrated circuit is provided that includes a scan testing clock control circuit and a memory bypass enable contact point. The scan testing clock control circuit enables control of a clock input signal to one or more memory devices within the integrated circuit. In one embodiment the scan testing clock control circuit includes a latch, and two AND gates. A scan test mode input and a memory bypass enable input are used to determine whether the memory will be permitted to receive a clock signal. Methods for scan testing using a scan testing clock control circuit are also provided.

8 Claims, 6 Drawing Sheets

SCAN TESTING MODE CONTROL OF GATED CLOCK SIGNALS FOR MEMORY DEVICES

BACKGROUND OF THE INVENTION

1. Field of the Invention

The present invention relates to integrated circuits, and more particularly, to scan testing of integrated circuits.

2. Background of Invention

Effective testing of integrated circuits significantly enhances the ability of integrated circuit developers and manufacturers to provide reliable devices. Various techniques have been employed to test integrated circuits during the manufacturing process. One such technique that is commonly known, and has been used within the industry for over twenty years is scan testing.

Scan testing provides an efficient approach to testing the structural integrity of devices, such as flip-flops, within a complex integrated circuit. Scan testing does not test integrated circuit-level functionality. Rather, test personnel use scan testing to confirm that individual flip-flops within an integrated circuit function properly. The sheer number of flip-flops within an integrated circuit, which is often greater than a million, presents a daunting challenge for testing. Scan testing addresses this challenge through the use of automated test units that provide test vectors to scan paths including thousands of flip-flops within integrated circuits that have been designed to support scan testing.

Typically, complex integrated circuits are designed and implemented as a series of interconnected functional blocks, each of which can be tested independently. Devices, such as flip-flops, within these functional blocks can be designed, such that they can be connected together in a scan path to support scan testing. Flip-flops and other elements within a scan path include, in addition to inputs and outputs used for normal operation, two inputs associated with the scan testing capability. These include a scan input (SI) and a scan enable (SE) input. Flip-flops within a scan path have their output connected to the SI input of a subsequent flip-flop. The first flip-flop within a scan path receives its input from an automated test unit through a test access port on the chip. The last flip-flop within a scan path provides its output to the automated test unit through a test access port. Many scan paths can exist within a single integrated circuit.

One challenge to providing effective scan testing is ensuring that the contents of memory devices remain constant or are controlled during scan testing. When the contents of memory devices are not controlled during testing, memory outputs can cause the contents of flip-flops under scan testing to unexpectedly change leading to output patterns that do not correspond to reference patterns. To control the content of memory devices, clock signals input into the memory devices must be controlled.

Furthermore, as processor speeds have increased, controlling memory during scan testing has become more complicated. Circuitry to control the clock input during testing must not induce delays into the clock signal input path during normal operation. Even slight delays on the order of picoseconds can potentially lead to erratic behavior in an integrated circuit.

What is needed are circuits and methods of control of clock signals for memory devices to facilitate efficient scan testing without impairing the normal operation of an integrated circuit.

SUMMARY OF THE INVENTION

The present invention is directed to circuits and methods to enhance scan testing by controlling clock pulses that are provided to memory devices within an integrated circuit. An integrated circuit is provided that includes a scan testing clock control circuit and a memory bypass enable input. The scan testing clock control circuit enables control of a clock signal that is provided to one or more memory devices within the integrated circuit. In one embodiment, a scan testing clock control circuit can be used to prevent a memory device from receiving a clock input signal during scan testing. In another embodiment, a scan testing clock control circuit can be used to control the specific timing of when a memory device receives a clock signal during scan testing. Methods for scan testing using a scan testing clock control circuit are provided.

There are several benefits associated with use of the invention. First, the invention can be used to prevent memory contents from changing during testing, thereby facilitating more predictable test results than if the memory contents changed. Second, the invention can be used to support sophisticated scan testing in which the contents of a memory device are changed in a controlled manner during scan testing. The invention does not induce timing delays that would hinder normal operation of an integrated circuit.

Further embodiments, features, and advantages of the invention, as well as the structure and operation of the various embodiments of the invention are described in detail below with reference to accompanying drawings.

BRIEF DESCRIPTION OF THE FIGURES

The invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
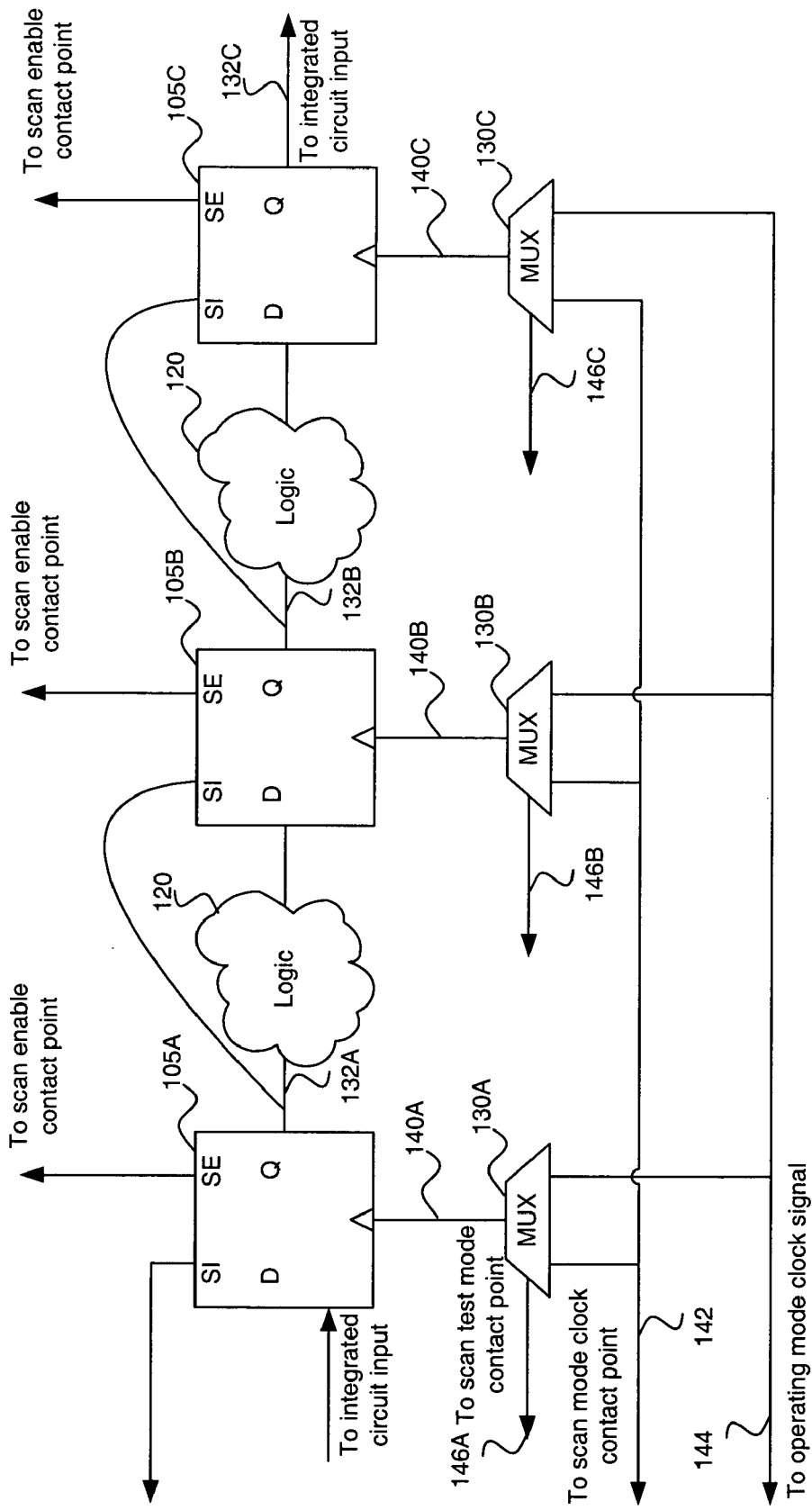
FIG. 1 is a diagram of a truncated scan path.

FIG. 1 illustrates an example of a truncated scan path within an integrated circuit. The scan path includes flip-flop 105A, flip-flop 105B, and flip-flop 105C. Flip-flop 105A represents the first flip-flop in the scan path. An SI input on flip-flop 105A is coupled to a scan input contact point. The scan input contact point provides an interface to an automated testing unit that allows test patterns to be inputted. An SE input on flip-flop 105A is coupled to a scan enable contact point.

Two modes exist within scan testing: shift mode and capture mode. In shift mode, a flip-flop will process inputs received on the SI input. The scan enable contact point provides an interface to an automated testing unit that allows the test unit to provide a signal that places a flip-flop into shift mode. In capture mode, a flip-flop will process inputs received on the D input, as would be the case in normal operating mode. In this case, a low signal is typically applied to the SE input to enter capture mode.

In general, the term contact point is used herein to refer to any electrical contact point within or on packaging that can be used to provide electrical coupling to an integrated circuit. The packaging provides a protective layer on a semiconductor wafer used to create the integrated circuit. Methods of packaging and types of packages are well known to individuals skilled in the relevant arts.

Output 132 of each flip-flop in a scan path is coupled to an SI input of the subsequent flip-flop in a scan path. For example, output 132A of flip-flop 105A is coupled to the SI input of flip-flop 105B. The output 132B of flip-flop 105B is coupled to the SI input of flip-flop 105C. As flip-flop 105C represents the last flip-flop in the scan path, its output 132C is coupled to an output contact point that can be coupled to the automated test unit to enable the test unit to monitor the output patterns during testing. Additionally, outputs 132 from flip-flops 105 are connected to other devices (e.g., logic 120) for normal operation—non-scan test mode—supporting integrated circuit logic and operations.

Clock inputs 140 for each of flip-flops 105 are received from a multiplexer, such as multiplexers 130A, 130B and 130C. Multiplexers 130 are coupled to clock signal inputs 142 and 144. Clock signal 144 is used for normal operation. Clock signal 142 is used in scan testing mode. In addition, as discussed further below, memory and other functional components contained within logic 120 will receive a clock signal. Each of multiplexers 130A, 130B, and 130C have a control input 146 connected to a scan test mode contact point. When scan testing is to take place, an automated test unit controls multiplexers 130A, 130B, and 130C via control inputs 146 to connect the scan testing mode clock signal 142 to the flip-flop clock inputs 140.

When scan testing takes place, normal operation is suspended and each flip-flop, such as flip-flops 105, within a scan path under test is instructed through the SE input to enter scan test shift mode. For example, a high signal may be placed on this input to enter scan test shift mode. Once the flip-flop, such as flip-flops 105, is in scan test shift mode, a test input signal will be inputted from a test vector to the SI input. One or more scan test clock signals, such as clock signal 142, can then be provided to the flip-flops under test to toggle the flip-flops and to clock out a scan test output. This output is compared to a reference pattern to verify correct operation. Differences between the reference pattern and output indicate some form of defect (e.g. flip-flop defects, connection between flip-flops defect, scan test defect), and the integrated circuit will be rejected, or subjected to additional tests. This procedure is typically repeated many times for different scan paths within an integrated circuit and using different test vectors, which are often referred to as a scan patterns.

As discussed above, one challenge during scan testing is to ensure that memory contents do not change or are controlled. For example, in FIG. 1 logic 120 typically includes memory that is coupled to flip-flop 105C. Changes to memory contents within logic 120 can affect the state of flip-flop 105C.

Figure 2:
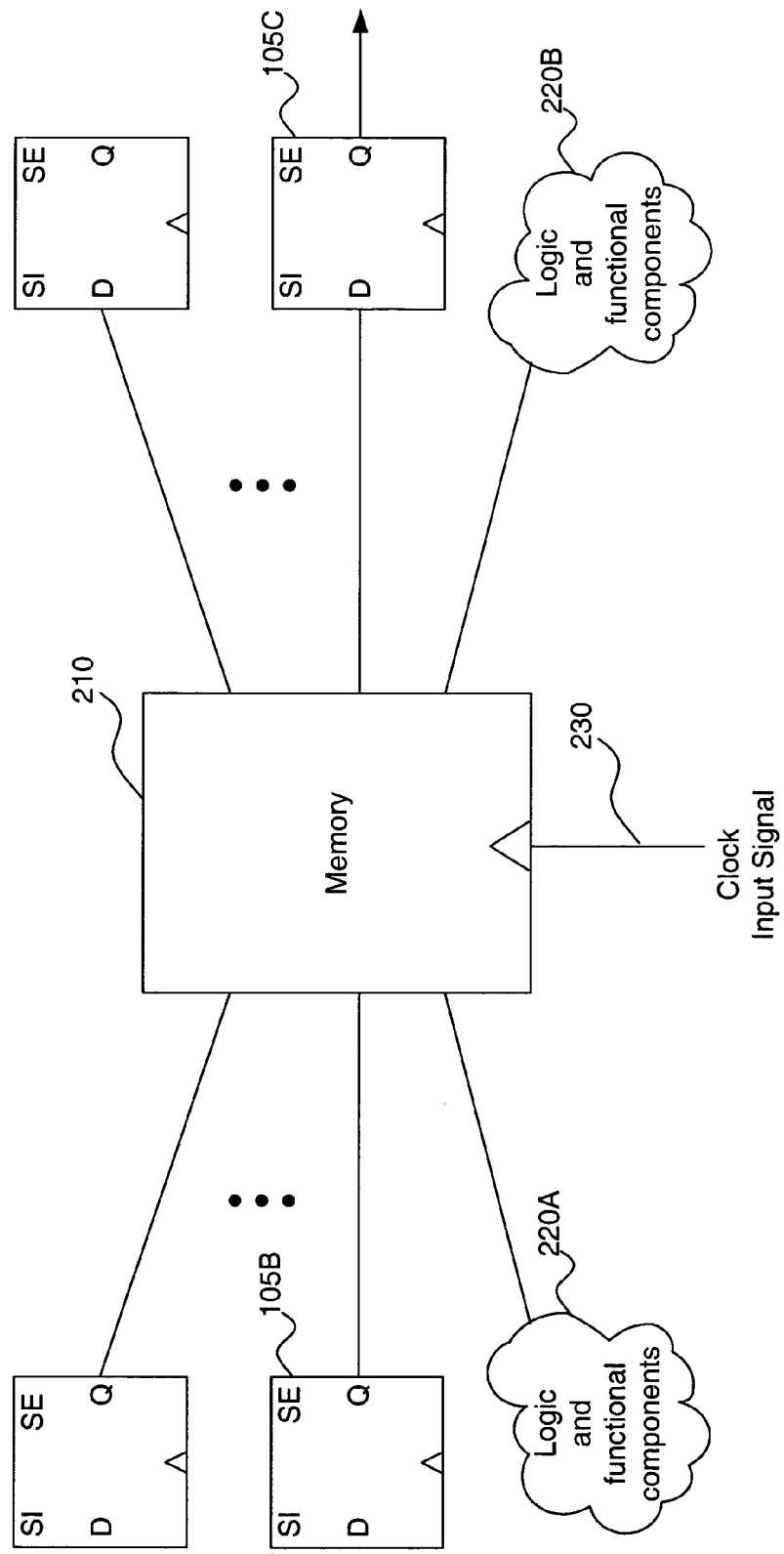
FIG. 2 is a diagram of memory device within an integrated circuit.

FIG. 2 is a block diagram of a portion of an integrated circuit that illustrates a relationship between memory devices and flip-flops undergoing scan testing. Memory 210 can be coupled to many different flip-flops, as well as to other logic and functional components. For example, in FIG. 2 memory 210 is connected to many flip-flops, such as flip-flop 105B and 105C. Additionally, memory 210 is connected to logic and functional components 220A and 220B. Memory 210 receives clock input signal 230. Typically, when memory 210 receives a clock input signal, memory 210 may output new data to various flip-flops, such as flip-flop 105C, which can cause outputs of the flip-flops to change. In other words, the changes in the memory state will often result in unpredictable changes to flip-flops that are being scan tested. Such changes can lead to unpredictable output patterns during scan testing that complicate the testing process.

Figure 3:
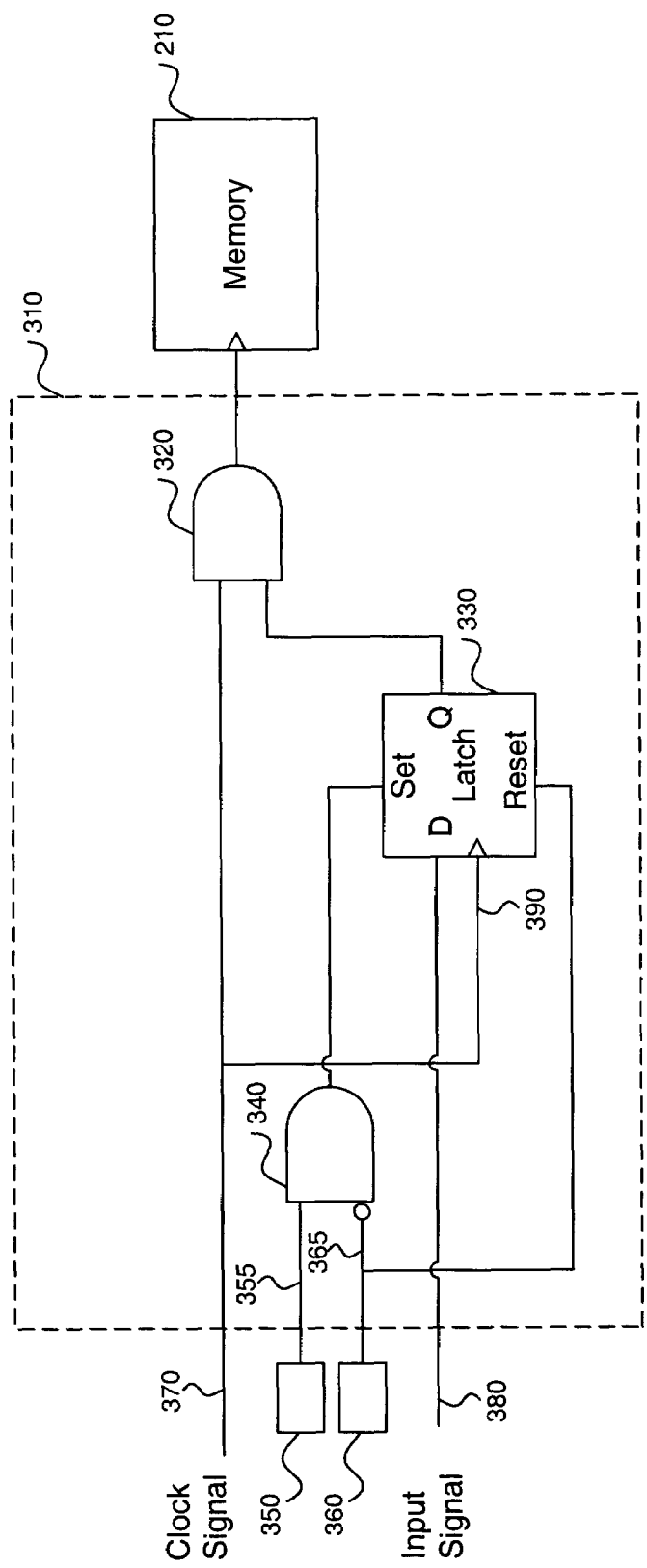
FIG. 3 is a diagram of an example scan testing clock control circuit for memory devices, according to an embodiment of the invention.

FIG. 3 is a logic diagram of scan test clock control circuit 310, according to an embodiment of the invention. Scan test clock control circuit 310 can be used to control the clock inputs to memory in an integrated circuit undergoing scan testing. By controlling the clock inputs to memory during scan testing, more reliable test results can be generated. Scan test clock control circuit 310 includes AND gate 320, latch 330 and AND gate 340.

AND gate 320 has two inputs. The first input is coupled to an external clock signal 370. During normal operation clock signal 370 controls circuit timing for normal functioning of the features of the integrated circuit. During scan mode testing clock signal 370 supports scan testing. The second input is coupled to an output of latch 330. An output of AND gate 320 is coupled to a clock input of memory 210.

AND gate 340 also has two inputs. The first input of gate 340 is coupled to a scan test mode input 355 through scan test mode contact point 350. The second input of AND gate 340 is coupled to memory bypass input 365 through memory bypass contact point 360. These contact points allow external access for testing.

The second input of AND gate 340 is an inverted input, such that when a high signal is coupled to AND gate 340, AND gate 340 receives a low signal and vice versa. Both the scan test mode input 355 and memory bypass input 365 can be coupled to scan test clock control circuit 310 through one or more contact points located on packaging that encloses the integrated circuit.

Latch 330 has four inputs and one output. The inputs are SET, RESET, D, and clock input 390. The output is Q. The SET input is coupled to the output of AND gate 340. The D input is coupled to an input signal for normal operation. This input can be coupled to a memory device, another flip-flop or other functional element within an integrated circuit. The clock signal input 390 receives clock signal 370, which can be used for normal operation or for scan test mode. The RESET input is coupled to memory bypass contact point 360. The Q output is coupled to AND gate 320.

Scan testing clock control circuit 310 enables control over memory timing during scan testing without impairing the normal operation of an integrated circuit. When in scan testing mode and scan test mode contact point 350 is high, scan testing clock control circuit 310 enables a test operator to control whether a clock input reaches memory 210. When in scan testing mode and scan enable contact point 350 is low, scan testing clock control circuit 310 enables memory 210 to receive a normal clock signal without imposing delay that adversely impacts the operation of the integrated circuit.

As will be known by individuals skilled in the relevant arts, in some circumstances a latching circuit is used for normal operation of an integrated circuit to ensure synchronous control of memories within an integrated circuit when a clocking signal is removed or applied. Scan testing clock control circuit 310 supports such latching functionality.

Scan testing clock control circuit 310 operates in the following manner. During scan testing there may be circumstances in which a test operator wants the contents of memory 210 to change in a controlled fashion. This test scenario is achieved in the following way. When a scan test mode input on scan test mode contact point 350 is set to high, and a memory bypass input on memory bypass input contact point 360 is set to low, the SET input of latch 330 will be high and the RESET input of latch 330 will be low. As a result the Q output will be high, which allows clock signal 370 to propagate through AND gate 320. In this case, memory 210 would receive a clock signal. This configuration is used during scan testing to ensure that memory contents of memory 210 change in a controlled manner.

During scan testing there may be circumstances in which a test operator does not want the contents of memory 210 to change. This test scenario is achieved by setting scan test mode input 355 to high and setting memory bypass input 365 to high. In this case, the SET input of latch 330 will go low and the RESET input would be high, thereby forcing latch 330 to output a low signal on the Q output. While the Q output is low, AND gate 320 will not allow the clock signal 370 to pass through to memory 210.

When not in scan testing mode, scan testing clock control circuit 310 always permits memory 210 to receive clock signal 370. More particularly, when scan test mode input 355 is low and memory bypass input 365 is low, the SET input of latch 330 will be low and the RESET input will be low. In this case, the output of scan test clock control circuit 310 that is coupled to memory 210 will be a function of input signal 380 that is received on a D input of latch 330.

Figure 4:
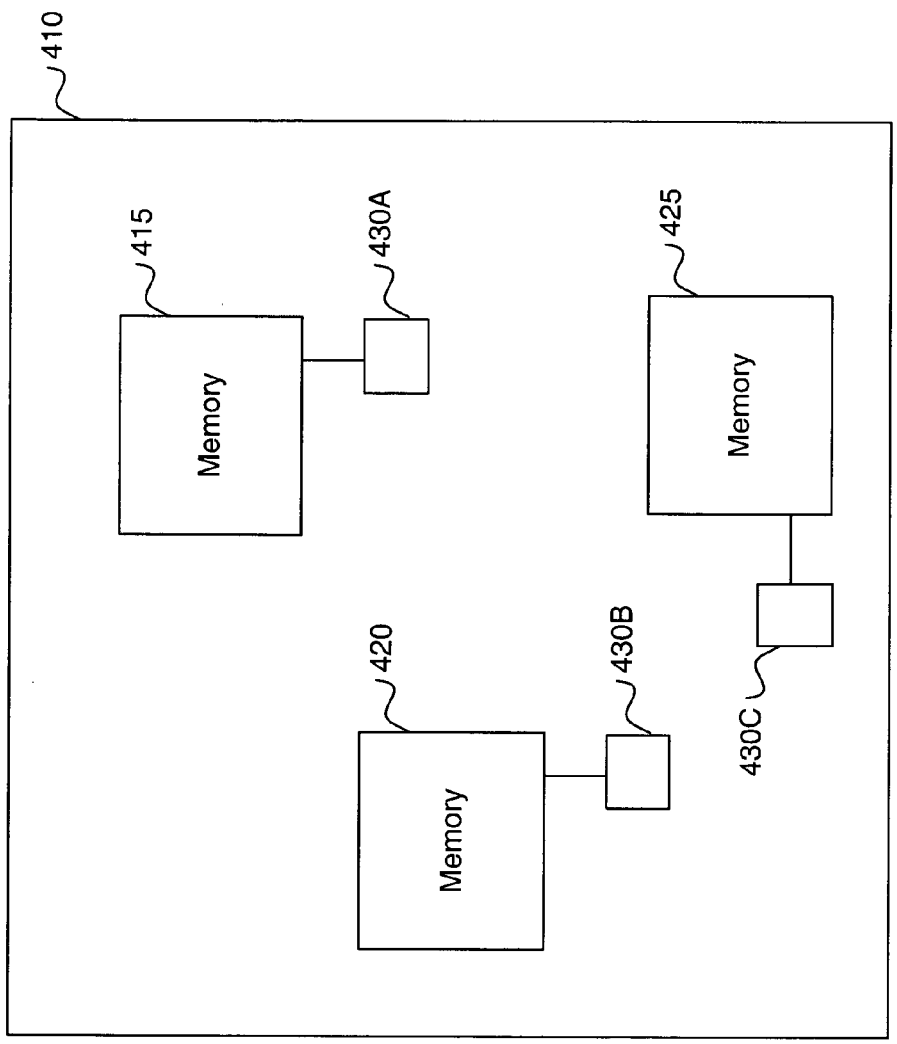
FIG. 4 is a diagram of an integrated circuit containing scan testing clock control circuits for memory devices, according to an embodiment of the invention.

The invention can be implemented for multiple memory devices. FIG. 4 illustrates a diagram of an integrated circuit 410 containing scan testing clock control circuits for multiple memory devices, according to an embodiment of the invention. Integrated circuit 410 includes memory 415, memory 420, memory 425, and scan testing clock control circuits 430A, 430B and 430C. In the embodiment shown, each memory has a corresponding scan testing clock control circuit. For example, scan testing clock control circuit 430A is coupled to memory 415. Scan testing clock control circuit 430B is coupled to memory 420. Scan testing clock control circuit 430C is coupled to memory 425. In alternative embodiments a single scan testing clock control circuit can be coupled to more than one memory device. For example, scan testing clock control circuit 430A could be coupled to both memory 415 and memory 420 to control clocking to memories during scan testing.

Figure 5A:
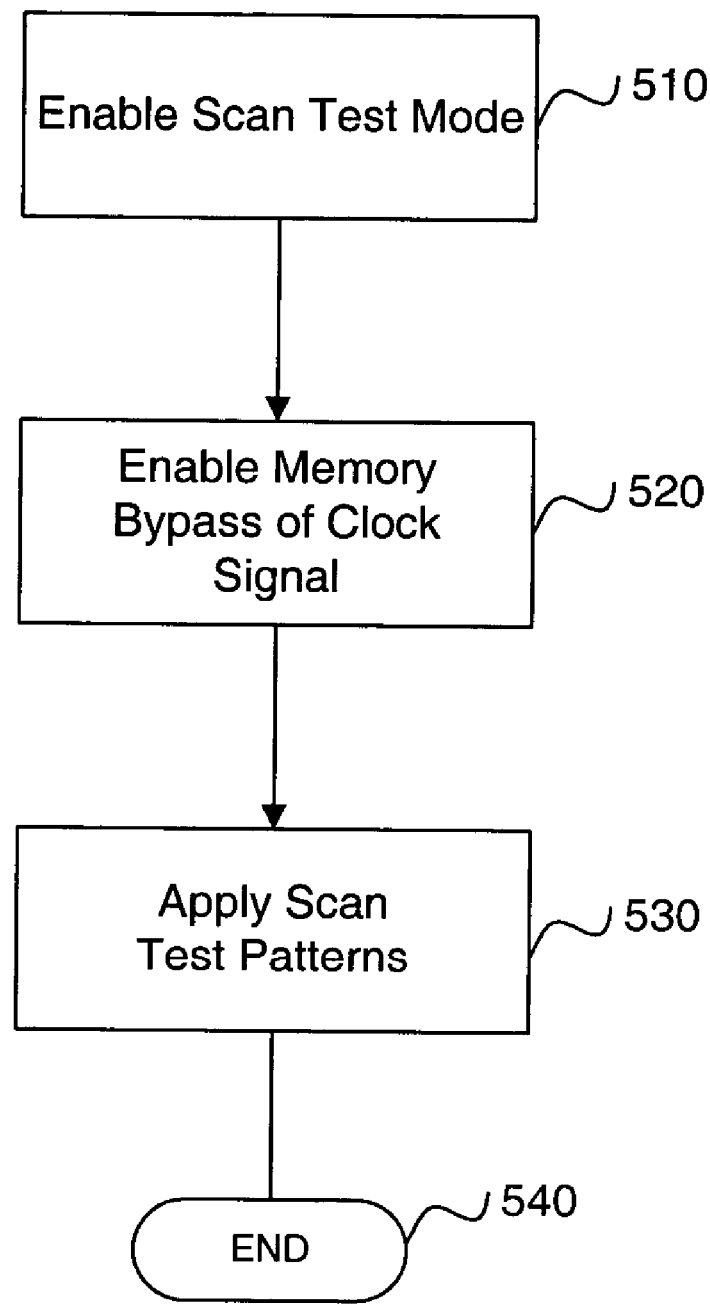
FIG. 5A is a flow chart of a scan testing method that prevents clock pulses from reaching a memory device, according to an embodiment of the invention.

FIG. 5A is a flow chart of a scan testing method 500 to prevent clock pulses from reaching a memory device, according to an embodiment of the invention. Scan testing method 500 begins in step 510. In step 510, scan test mode is enabled and scan test mode is set to high. For example, a high signal can be applied to a scan test mode contact point, such that a scan testing clock control circuit would receive a high signal as a scan test mode input.

In step 520, memory bypass of a clock signal is enabled. In one embodiment, a signal is provided on a memory bypass input, such as one that can be present on memory bypass contact point 360, that prevents clock input signals from reaching a memory, such as memory 210.

In step 530 scan test patterns are applied. For example, a test operator can input test patterns to flip-flop 105A, and monitor the output of flip-flop 105C to compare the output pattern to a reference pattern to confirm that the flip-flops are working correctly, while memory contents remain stable. In step 540 method 500 ends.

Figure 5B:
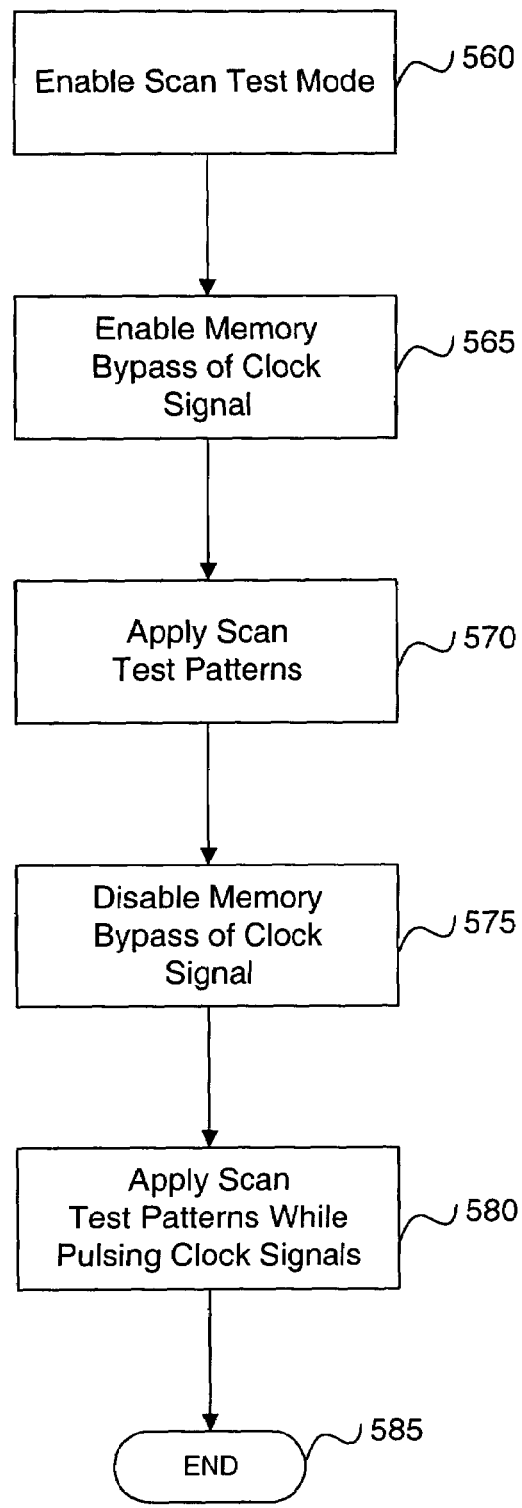
FIG. 5B is a flow chart of a scan testing method that controls clock pulses that reach a memory device, according to an embodiment of the invention.

In some circumstances controlled changes in memory contents may be desired during scan testing. FIG. 5B is a flow chart of a scan testing method 550 to control clock pulses that reach a memory device, according to an embodiment of the invention. Scan testing method 550 begins in step 560. In step 560, scan test mode is enabled and scan test mode is set to high. For example, a high signal can be applied to a scan test mode contact point, such that a scan testing clock control circuit would receive a high signal on a scan test mode input.

In step 565, memory bypass of a clock signal is enabled. In one embodiment, a signal is provided on a memory bypass input, such as one that can be present on memory bypass contact point 360, that prevents clock input signals from reaching a memory, such as memory 210. In step 570 scan test patterns are applied. For example, a test operator can input test patterns to flip-flop 105A, and monitor the output of flip-flop 105C to compare the output pattern to a reference pattern to confirm that the flip-flops are working correctly, while memory contents remain stable. In step 575, memory bypass of a clock signal is disabled. In one embodiment, the signal applied in step 565 is removed. In step 580 scan test patterns are applied to the scan path under test, while controlled pulsing of clock signals to memory occurs. In step 585, method 550 ends.

Conclusion

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. An integrated circuit having at least one memory device and a scan test mode contact point, comprising:
    (a) a scan testing clock control circuit, wherein said scan testing clock control circuit enables control of a clock input signal to the at least one memory device during scan testing and permits the at least one memory device to receive a clock input signal during normal operation, wherein said scan testing clock control circuit includes:
        (i) a latch;
        (ii) a first AND gate including a first input coupled to an output of said latch; and
        (iii) a second AND gate having an inverter on a first input and having an output coupled to said latch; and
    (b) a memory bypass enable contact point coupled to said scan testing clock control circuit.

2. The integrated circuit of claim 1, wherein said latch includes a SET input, a RESET input, a clock input, a D input and a Q output.

3. The integrated circuit of claim 2,
wherein said second AND gate includes a second input coupled to said scan test mode contact point, wherein said first input of second AND gate is coupled to said memory bypass enable contact point, wherein the SET input of said latch is coupled to an output of said second AND gate,
wherein the RESET input of said latch is coupled to said memory bypass enable contact point,
wherein the clock input of said latch is coupled to a clock signal,
wherein a second input of said first AND gate is coupled to the clock signal,
wherein an output of said first AND gate is coupled to a clock input on the at least one memory device.

4. A method to control clock pulses to a memory device during scan testing of an integrated circuit having the memory device and a scan testing control circuit, comprising the steps of:
 (a) enabling scan test mode on at least one scan path and within the scan testing clock control circuit;
 (b) enabling memory bypass within the scan testing clock control circuit to prevent the memory device from receiving a clock input signal;
 (c) applying scan test patterns to the at least one scan path;
 (d) disabling memory bypass within the scan testing clock control circuit to allow the memory device to receive a clock input signal; and
 (e) pulsing a clock signal to the memory device on the same signal path for the clock signal that is used when memory bypass is enabled; and
 (f) applying an additional scan test pattern to the at least one scan path.

5. An integrated circuit having at least one memory device and a scan test mode contact point, comprising:
 (a) a scan testing clock control circuit, wherein said scan testing clock control circuit enables control of a clock input signal to the at least one memory device during scan testing and permits the at least one memory device to receive a clock input signal during normal operation, wherein said scan testing clock control circuit includes a clock signal path which is used during testing and normal operation that does not induce timing delays that would hinder normal operation of the integrated circuit; and
 (b) a memory bypass enable contact point coupled to said scan testing clock control circuit.

6. The integrated circuit of claim 5, wherein said scan testing clock control circuit includes:
 (i) a latch;
 (ii) a first AND gate including a first input coupled to an output of said latch; and
 (iii) a second AND gate having an inverter on a first input and having an output coupled to said latch.

7. The integrated circuit of claim 6, wherein said latch includes a SET input, a RESET input, a clock input, a D input and a Q output.

8. The integrated circuit of claim 7,
wherein said second AND gate includes a second input coupled to said scan test mode contact point, wherein said first input of second AND gate is coupled to said memory bypass enable contact point,
wherein the SET input of said latch is coupled to an output of said second AND gate,
wherein the RESET input of said latch is coupled to said memory bypass enable contact point,
wherein the clock input of said latch is coupled to a clock signal,
wherein a second input of said first AND gate is coupled to the clock signal,
wherein an output of said first AND gate is coupled to a clock input on the at least one memory device.

* * * * *